United States Patent Office 3,420,340
Patented Jan. 7, 1969

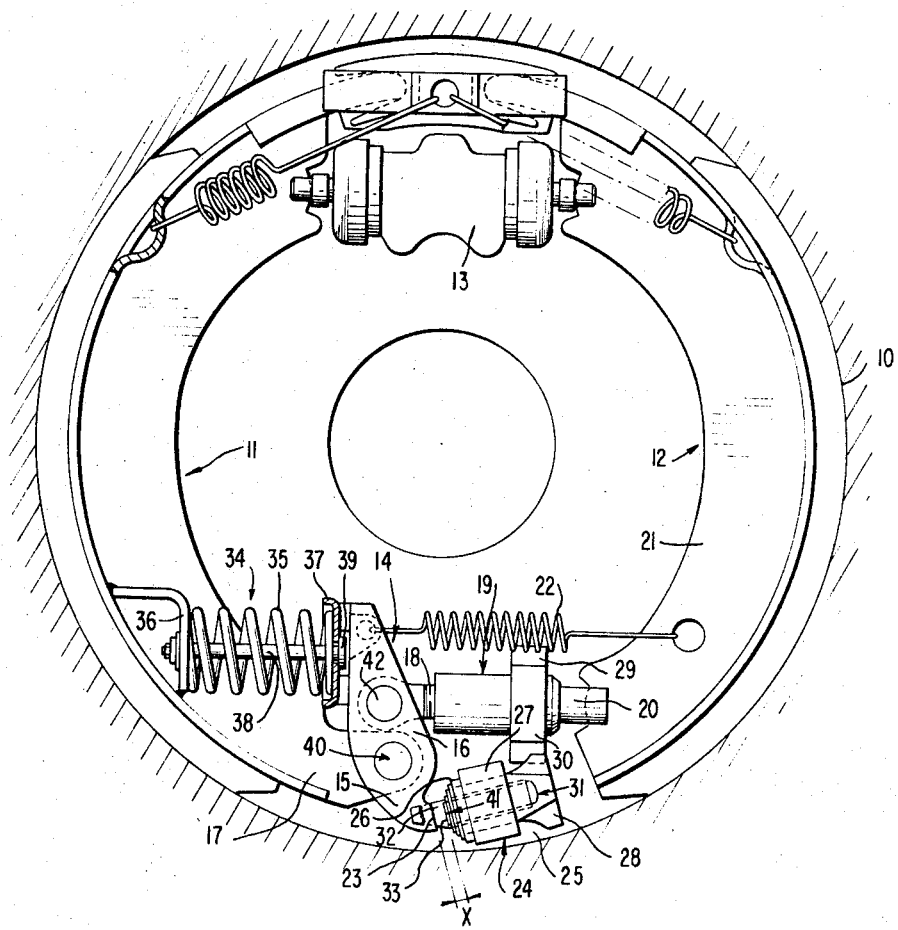

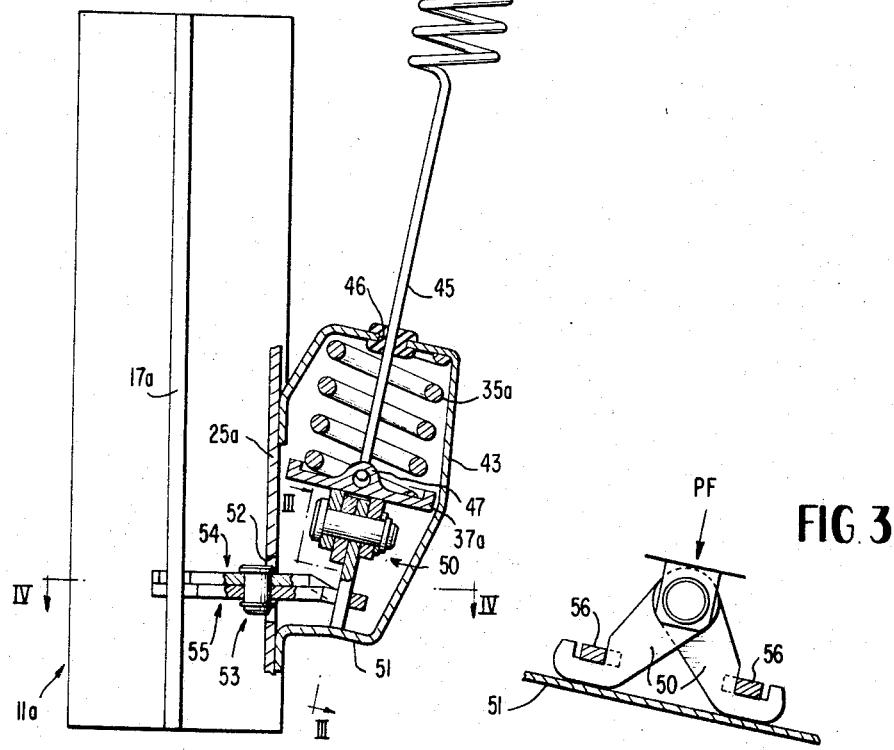

3,420,340
SERVO DRUM BRAKE FOR COMMERCIAL-TYPE VEHICLES
Wilhelm Hopf, Stuttgart, Germany, assignor to Daimler-Benz Aktiengesellschaft, Stuttgart-Unterturkheim, Germany
Filed June 24, 1966, Ser. No. 560,286
Claims priority, application Germany, June 26, 1965, D 47,605
U.S. Cl. 188—79.5  36 Claims
Int. Cl. F16d 51/00

ABSTRACT OF THE DISCLOSURE

A servo drum brake arrangement, especially for commercial-type motor vehicles provided with a brake drum and a primary brake shoe and a secondary brake shoe freely supported within the brake drum, and operatively connected for the transmission of force from the primary shoe to the secondary shoe, wherein a force reduction lever is interposed between the primary brake shoe and the secondary brake shoe, which force reduction lever is bypassed at brake moments below a predetermined level by means of an elastic intermediate member.

---

The present invention relates to a servo drum brake, especially for commercial-type vehicles, provided with a primary brake shoe and a secondary brake shoe floatingly supported in the brake drum and mutually supporting each other.

Such types of servo brakes have the disadvantage, compared to the high braking effect thereof, of high sensitivity as regards fluctuations in the friction value. With an increase of the frictional value there exists therefore the danger by reason of the servo effect from the primary brake shoe that the drum brake is locked or blocked by the secondary brake shoe.

The purpose underlying the present invention essentially consists in eliminating the aforementioned disadvantages with a servo drum brake of the type described above. According to the present invention, the aim is solved in that there is arranged in the power path between the primary and the secondary brake shoe a device for a force reduction including an input member on the primary side having a larger input force and adapted to be supported as reaction member at the brake carrier and an output member on the secondary side having a smaller input force. By the use of this arrangement in accordance with the present invention a servo force, reduced with respect to the abutment force of the primary brake shoe, is effective on the more highly loaded secondary brake shoe whereby the danger of the locking or blocking of the brake is avoided in a simple and advantageous manner.

In order to be able to maintain during braking below a braking moment critical in relation to the blocking, the advantageous servo effect of the primary brake shoe in its unreduced magnitude, according to a further development of the present invention the reaction member of the device for the force reduction is adapted to be moved from a neutral position determined by the disengaged position of the brake shoes under the influence of the abutment force of the primary brake shoe into an engaging position with a fixed brake carrier part and the device for the force reduction is adapted to be bypassed or bridged by means of an elastic intermediate member effective between the primary and secondary brake shoes which, in the engaging position of the reaction member, is able to abut in the force direction toward the secondary brake shoe against a stationary abutment fixed in relation to the relative movement thereof with respect to the primary brake shoe. During movements of the primary brake shoe under the influence of its reaction force between the neutral position and the engaging position of the reaction member, the brake according to the present invention remains operative as a conventional servo brake for such length of time as the rise of the reaction force over the movement of the primary shoe is smaller than the spring constant of the intermediate member. As soon as the reaction force at the primary brake shoe, which acts as servo force on the secondary brake shoe, is larger than the spring force of the intermediate member, the reaction member comes into engagement with the brake carrier part and the device for the force reduction between primary and secondary brake shoes becomes effective. The bridging or bypassing of this device is thereby lifted in that the respective intermediate member abuts against a stop or abutment whence its force transmission is eliminated.

The effect and operation of the brake according to the present invention can be matched to the respective type of vehicle and to the different friction linings by the selection of a suitable prestress at the elastic intermediate member.

In order to be able to adjust the position of the abutment at the brake carrier for the reaction member by reason of the wear of the friction lining, according to another feature of the present invention the reaction member is adapted to be supported against a nonrotatable, first threaded part whereby the associated second threaded part is rotatably supported at the brake carrier but non-displaceably with respect thereto.

It is known with servo drum brakes of the aforementioned type to provide for purposes of compensation of the friction lining wear, a compensating mechanism having an adjusting member as well as a primary pressure piece and a secondary pressure piece between the brake shoes. In the application of the present invention to such a servo drum brake, the device for the force-reduction may be arranged in the power path between a brake shoe and the associated pressure piece of the compensating mechanism.

A servo brake equipped and constructed with the features according to the present invention may also be utilized in a simple and advantageous manner as rear wheel brake, if one changes the prestress of the elastic intermediate member by an adjusting device influenced preferably by the load of the vehicle. For example, a movable abutment of the elastic intermediate member may thereby have a motion-responsive connection with a sprung or spring-supported vehicle part.

With one embodiment of a rear wheel servo brake according to the present invention, the elastic intermediate member and its abutment are arranged at the bake carrier, whereby the movable abutment, on the one hand, is connected by way of an elastic linkage with the spring supported vehicle part, and on the other, is operatively connected by way of an adjusting device transmitting the spring-force of the intermediate member with the secondary output member of the device for the force reduction.

According to a still further advantageous construction of the present invention, one or several compression springs may be arranged as elastic intermediate member within a housing of the brake carrier on the vehicle inside and may be supported as movable abutment, on the one hand, against the housing and, on the other, against a spring washer or spring plate. For the connection of the spring plate with the elastic linkage at the spring-supported vehicle part, a member which is preferably coaxial to the compression spring of the elastic linkage may be displaceably guided through an opening of the housing and may be pivotally connected at a part of the spring plate on the side of the compression spring.

At the side of the spring plate opposite the compression spring, a knee-lever or toggle-lever pair may be pivotally connected in an advantageous manner as input member of a guide linkage transmitting the compression spring force whose lever arms deflectingly engage at a housing part perpendicular to the spring axis. The knee-lever or toggle-lever pair is thereby in engagement with the lever arms of lever shears extending freely movably through the brake carrier with the lever arms of the lever shears extending into the housing of the compression spring. One lever arm of the lever shears is pivotally connected as the reaction member thereof at the primary brake shoe whereby the secondary output member of the device is adapted to be supported for the purpose of the force-reduction against the other lever arm of the lever shears forming the output member of the guide linkage and engaging in a guide means at the primary brake shoe.

Accordingly, it is an object of the present invention to provide a servo drum brake installation of the type described above which eliminates by simple means the shortcomings and drawbacks encountered with the prior art constructions.

It is another object of the present invention to provide a servo brake system for drum brakes, especially for commercial-type motor vehicles which prevents locking of the brake in an extraordinarily simple and operationally reliable manner.

A further object of the present invention resides in a servo brake system for drum brakes of vehicles which operates with the normal servo effect up to a predetermined, critical value and only produces a force-reduction of the servo force upon exceeding this critical value so as to maintain an advantageous operation of the brake system within the range below the critical value.

Still another object of the present invention resides in a servo-brake system for drum-type brakes which not only achieves all of the aforementioned aims and objects in a most satisfactory manner but which also permits a matching of the brake effect to the particular type of vehicle and/or to the brake linings used.

These and other objects, features and advantages of the present invention will become more obvious from the following description, when taken in connection with the accompanying drawing, which shows, for purposes of illustration only, two embodiments of a servo brake system in accordance with the present invention, and wherein:

FIGURE 1 is a transverse cross-sectional view through the brake drum of a motor vehicle front wheel, equipped with a servo brake in accordance with the present invention;

FIGURE 2 is a somewhat schematic view illustrating a servo drum brake according to the present invention having an elastic intermediate member with adjustable prestress arranged at the brake carrier of a vehicle rear wheel;

FIGURE 3 is a cross-sectional view taken along line III—III of FIGURE 2; and

FIGURE 4 is another cross-sectional view, taken along line IV—IV of FIGURE 2.

Referring now to the drawing wherein like reference numerals are used throughout the various views to designate like parts, and more particularly to FIGURE 1, reference numeral 10 designates therein a brake drum, within which are floatingly supported a primary brake shoe generally designated by reference numeral 11 and a secondary brake shoe generally designated by reference numeral 12. The tightening or clamping force for both brake shoes 11 and 12 is produced by a brake cylinder 13 of conventional construction. A two-armed lever member generally designated by reference numeral 14 having a primary lever arm 15 on the primary side and a secondary lever arm 16 on the secondary side is rotatably supported at the web 17 of the primary brake shoe 11 at the lower end thereof by means of the pivotal connection generally designated by reference numeral 40. The secondary lever arm 16 is pivotally connected at a primary pressure piece 18 located on the primary side of a compensating mechanism generally designated by reference numeral 19 for the readjustment of the brake. The secondary pressure piece 20 located on the secondary side of this compensating mechanism 19 is supported at the web 21 of the secondary brake shoe 12. A return spring 22 engages at the web 21 and the secondary lever arm 16 of the lever member 14. The lever arm 15 is retained as reaction member of the two-armed lever member 14 in the illustrated neutral position by the return spring 22. In the neutral position, an engaging or contact surface 23 of the reaction member 15 has a distance $x$ from an abutment generally designated by reference numeral 24 of the stationary brake carrier 25. The abutment 24 is constituted by a fixed bearing housing 26 of the brake carrier structure 25. A threaded nut 27 is rotatably but nondisplaceably supported within the bearing housing 26. The threaded nut 27 engages by means of a bevel gear-shaped toothed system 28 with the claw teeth 29 provided at the adjusting member 30 of the compensating mechanism 19. An abutment screw 31 which is provided with a fork-shaped slot guidance 32 is threaded into the nut 27. The primary lever arm 15 engages in the fork-shaped slotted guide means 32 so that the abutment screw 31 cannot rotate. The slotted guide means 32 is limited by an abutment surface 33 against which the lever arm 15 is adapted to be supported by way of its engaging or contact surface 23. The two-armed lever member 14 is adapted to be bridged by an elastic intermediate member generally designated by reference numeral 34 which is constituted essentially by a prestressed compression spring 35. The compression spring 35 rests, on the one hand, against a fixed abutment 36 of the primary brake-shoe web 17 and on the other, against a spring washer or plate 37. The spring plate 37 is displaceably guided on a bolt 38 coaxial to the compression spring 35 between the abutment 36 and the bolt head 39 whereby the bolt 38 is securely connected with the abutment 36.

The elastic intermediate member 34 may also be constituted by two compression springs arranged on both sides of the web 17 which are supported at the abutment 36 and at a correspondingly constructed spring washer 37. Also, the two-armed lever member 14 may consist of two lever parts arranged on both sides of the web 17 and connected with each other so as to rotate in unison.

The bolt head 39 and the lever arm 16 are not disposed in the same plane so that during rotary movements of the lever member 14 about its pivot point generally designated by reference numeral 40 at the web 17, the lever arm 16 cannot come into contact with the bolt head 39.

*Operation*

The operation of the servo drum brake according to FIGURE 1 is as follows:

The brake shoes 11 and 12 are in the disengaged position thereof and the reaction member 15 (primary lever arm) is in the illustrated neutral position. If a braking or tightening force is transmitted by way of the brake cylinder 13 to the brake shoes 11 and 12, then the reaction force of the primary brake shoe 11, which appears as servo effect on the secondary brake shoe 12, is transmitted in its full value by way of the compression spring 35 and the secondary lever arm 16 on the secondary side of the lever member 14 onto the secondary brake shoe 12. Under the influence of the increasing reaction force of the primary brake shoe 11, the latter and therewith the lever arm 15 is moved in the direction toward the abutment 24 and the distance $x$ decreases.

If the reaction force of the primary brake shoe 11 becomes larger than the spring force of the compression spring 35, then the lever arm 15 is moved into its engaging position up to the abutment surface 33 at the abutment 24. The lever member 14 thereby forms a one-armed reduction lever rotatable about the imaginary contact point 41 of the surfaces 23 and 33 for the reaction force of the primary brake shoe 11 whose lever arm between the pivot point 40 and the point of rotation 41 of the lever is smaller than the lever arm between the pivotal connecting point 42 of the secondary lever arm 16 at the pressure piece 18 and the point of rotation 41 of the lever. The force component acting at the point of pivotal connection 42 of the pressure piece 18 and on the secondary brake shoe 12 as servo force is therefore reduced with respect to the reaction force of the primary brake shoe 11.

The same operation of the servo brake in accordance with the present invention as described above also occurs when the reaction force of the primary brake shoe 11 acting at the point of pivotal connection 40 remains during longer braking operations below the spring force of the compression spring 35 since the lever arm 15 is moved as reaction member into its engaging position up to the abutment surface 33 by the displacement of the primary brake shoe 11 in the direction toward the abutment 24 which always occurs in that case.

The distance $x$ would increase to a nonpermissive extent by the readjustment of the brake by means of the adjusting member 30 of the compensating mechanism 19 required by reason of wear of the brake linings. As a result of the meshing engagement of the adjusting member 30 with the threaded nut 27, the abutment surface 33 for the lever arm 15 is forcibly displaced with the readjustment of the brake in such a manner that in the neutral position of the lever arm 15, the predetermined distance $x$ thereof from the abutment surface 33 is maintained.

According to FIGURE 2, a housing 43 is secured at a brake carrier 25a of a motor vehicle rear wheel on the side facing the vehicle inside. A compression spring 35a is arranged within the housing 43 as elastic intermediate member for bridging or bypassing the device for the force-reduction generally designated by reference numeral 44 in FIGURE 4. This device 44 may, for example, be constructed in an identical manner to that illustrated in connection with the front-wheel servo brake of FIGURE 1.

The compression spring 35a is supported, on the one hand, against the housing 43 and, on the other, against a spring disk or plate 37a. One spring end 45 of a coil spring 48 concentric to the compression spring 35a is displaceably guided through an opening 46 of the housing 43 and is pivotally connected at a part 47 of the spring washer 37a on the side of the spring 35a. The coil spring 48 engages with a spring-supported part 49 of the vehicle. A pair of one-armed knee-levers or toggle-levers generally designated by reference numeral 50 is pivotally connected at the spring washer 37a on the side opposite the compression spring 35 (FIGURE 2). The knee-lever or toggle-lever pair 50 engages deflectingly with a portion 51 of the housing 43 disposed perpendicularly to the spring axis (FIGURE 3). Lever shears generally designated by reference numeral 53 extend in a freely movable manner with the lever arms 54 and 55 thereof through an aperture 52 of the brake carrier 25a into the housing 43 whereby the lever ends 56 of the lever shears 53 on the inside of the housing 43 are in motion-responsive connection with the knee-lever or toggle-lever pair 50. The lever end 57 of the lever arm 55 is pivotally connected on the outside of the housing 43 as reaction member of the lever shears 53 at the web 17a of the primary brake shoe 11a of the rear wheel servo brake (FIGURE 4). The other lever arm 54 of the lever shears 53 engages with its lever end 58 on the outside of the housing 43 in a guide means 59 at the web 17a of the primary brake shoe 11a. The secondary output members 16a of the device for the force reduction 44 (not illustrated in this embodiment) between the primary brake shoes 11a and the non-illustrated secondary brake shoe, which is of similar construction to that described in connection with FIGURE 1, is adapted to be supported against the lever end 58 of the lever arm 54 on the outside of the housing 43.

*Operation*

The operation of the servo brake illustrated in FIGURES 2 to 4 is as follows:

The spring force of coil spring 48 acts opposite the prestress of the compression spring 35a. The spring force of the coil spring 48 is dependent on the vehicle load. The resultant prestress at the spring washer 37a is transmitted by way of the knee-lever or toggle-lever pair 50 and the lever shears 53 to the secondary output member 16a. The bypassing or bridging brought about by the compression spring 35a of the device for the force-reduction is lifted or eliminated depending on the magnitude of the net, resulting prestress. The compression spring 35a then is supported by way of the lever arm 54 at a fixed abutment 60 (FIGURE 4) of the primary brake shoe 11a. As to the rest the operation of the rear wheel servo brake is the same as that described in connection with the front wheel servo brake illustrated in FIGURE 1 with the exception of the variable prestress of the elastic intermediate member constituted by the coil spring 35a (FIGURE 2).

For purposes of increasing the prestress of the elastic intermediate member 34 (FIGURE 1), the return spring 22 may also engage at the spring plate or spring washer 37 in lieu of at the lever arm 16.

I claim:

1. A servo drum brake, especially for commercial-type vehicles, comprising brake carrier means, primary brake shoe means, secondary brake shoe means, brake drum means, said primary and secondary brake shoe means being floatingly supported within said brake drum means, and force-reduction means in the power path between said primary brake shoe means and said secondary brake shoe means including a power input member on the primary side there of having a reaction member engaging said brake carrier means and a power output member on the secondary side thereof, wherein said reaction member is movable from a neutral position determined by the disengaged position of the brake shoe means under the influence of the reaction force of said primary brake shoe means into an engaging position with a fixed part of said brake carrier means, and further comprising bridging means including elastic intermediate means operable between said primary and secondary brake shoe means for effectively bridging said force reduction means, and abutment means fixed in relation to the relative movement of the secondary brake shoe means to said primary brake shoe means, said intermediate means being supported against said abutment means in the engaging position of said reaction member in the force direction toward said secondary brake shoe means.

2. A brake according to claim 1, further comprising an abutment on said primary brake shoe means, said elastic intermediate means being under prestress by said abutment.

3. A brake according to claim 2, further comprising a nonrotatable first threaded part, said reaction member being supported against said first threaded part, and a second threaded part associated with said first threaded part, said second threaded part being rotatably but nondisplaceably supported said brake carrier means.

4. A brake according to claim 3, further comprising compensating means for compensating for the wear of the brake lining including an adjusting member, a primary pressure piece and a secondary pressure piece between said brake shoe means, said force reduction means being operatively interposed in the power path between one of said brake shoe means and a respective pressure piece of the compensating means.

5. A brake according to claim 4, further comprising a motion-responsive connection between said adjusting member and said second threaded part, and means for displacing said first threaded part in the direction of the reaction member of the force reduction means by the compensating movements of said adjusting member.

6. A servo drum brake, especially for commercial-type vehicles, comprising brake carrier means, primary brake shoe means, secondary brake shoe means, brake drum means, said primary and secondary brake shoe means being floatingly supported within said brake drum means, and force-reduction means in the power path between said primary brake shoe means and said secondary brake shoe means including a power input member on the primary side thereof having a reaction member engaging said brake carrier means and a power output member on the secondary side thereof, further comprising a nonrotatable first threaded part, said reaction member being supported against said first threaded part, and a second threaded part associated with said first threaded part, said second threaded part being rotatably but nondisplaceably supported at said brake carrier means.

7. A brake according to claim 6, further comprising compensating means for compensating for the wear of the brake linings including an adjusting member, a primary pressure piece and a secondary pressure piece between said brake shoe means, said force reduction means being operatively interposed in the power path between one of said brake shoe means and a respective pressure piece of the compensating means.

8. A brake according to claim 7, further comprising a motion-responsive connection between said adjusting member and said second threaded part, and means for displacing said first threaded part in the direction of the reaction member of the force reduction means by the compensating movements of said adjusting member.

9. A servo drum brake, especially for commercial-type vehicles, comprising brake carrier means, primary brake shoe means, secondary brake shoe means, brake drum means, said primary and secondary brake shoe means being floatingly supported within said brake drum means, and force-reduction means in the power path between said primary brake shoe means and said secondary brake shoe means including a power input member on the primary side thereof having a reaction member engaging said brake carrier means and a power output member on the secondary side thereof, further comprising compensating means for compensating for the wear of the brake linings including an adjusting member, a primary pressure piece and a secondary pressure piece between said brake shoe means, said force reduction means being operatively interposed in the power path between one of said brake shoe means and a respective pressure piece of the compensating means.

10. A brake according to claim 5, wherein said force reduction means includes two-armed lever means pivotally connected at said primary brake shoe means, one lever arm of said two-armed lever means being supported as reaction members at said brake carrier means and the other lever arm being operatively connected with the pressure piece on the primary side of said compensating means.

11. A brake according to claim 10, wherein said other lever arm is supported against at least one compression spring effective as elastic intermediate means whose counter abutment is constituted by a fixed stop at the primary brake shoe means.

12. A brake according to claim 11 further comprising return spring means operatively connected between one lever arm of said two-armed lever means and the respective brake shoe means.

13. A brake according to claim 12, wherein said one lever arm engages at said primary brake shoe means in a fork-shaped slotted guide means provided in said first threaded part supported at the brake carried means.

14. A brake according to claim 13, wherein said second threaded part which is rotatably and nondisplaceably supported at said brake carrier means is in toothed meshing engagement with the adjusting member of the compensating means.

15. A brake according to claim 14, further comprising spring plate means displaceably guided at the primary brake shoe means between two fixed abutments, at least one compression spring forming part of the intermediate means being supported, on the one hand, against one of said abutments and on the other, against said spring plate means, the other lever arm of the two-armed lever means being supported at the primary brake shoe means against the spring plate means.

16. A brake according to claim 15, wherein several of said compression springs are provided.

17. A brake according to claim 9, wherein said force reduction means includes two-armed lever means pivotally connected at said primary brake shoe means, one lever arm of said two armed lever means being supported as reaction member at said brake carrier means and the other lever arm being operatively connected with the pressure piece on the primary side of said compensating means.

18. A brake according to claim 17, wherein said other lever arm is supported against at least one compression spring effective as elastic intermediate means whose counter abutment is constituted by a fixed stop at the primary brake shoe means.

19. A brake according to claim 17, further comprising return spring means operatively connected between one lever arm of said two-armed lever means and the respective brake shoe means.

20. A brake according to claim 17, further comprising a non-rotatable first threaded part, said reaction member being supported against said first threaded part, and a second threaded part associated with said first threaded part, said second threaded part being rotatably but nondisplaceably supported at said brake carrier means.

21. A brake according to claim 20, wherein said one lever arm engages at said primary brake shoe means in a fork-shaped slotted guide means provided in said first threaded part supported at the brake carrier means.

22. A brake according to claim 20, wherein said second threaded part which is rotatably and nondisplaceably supported at said brake carrier means is in toothed meshing engagement with the adjusting member of the compensating means.

23. A brake according to claim 17, further comprising spring plate means displaceably guided at the primary brake shoe means between two fixed abutments, at least one compression spring forming part of the intermediate means being supported, on the one hand, against one of said abutments and on the other, against said spring plate means, the other lever arm of the two-armed lever means being supported at the primary brake shoe means against the spring plate means.

24. A brake according to claim 1, further comprising means for adjusting the prestress of the elastic intermediate means in dependence on the load of the vehicle.

25. A brake according to claim 24, wherein said last-mentioned means includes a movable abutment of the intermediate means which is in motion-responsive connection with a spring supported vehicle part.

26. A brake according to claim 25, wherein said elastic intermediate means and its abutment are arranged at the brake carrier means, and wherein said movable abutment is connected, on the one hand, by way of an elastic linkage with the spring-supported vehicle part and, on the other, by way of an adjusting mechanism transmitting the spring-force of the intermediate means with the output member of the force-reduction means.

27. A brake according to claim 26, wherein at least one compression spring is arranged as elastic intermediate means within a housing means of the brake carrier means on the vehicle inside, said compression spring being supported, on the one hand, against said housing means and, on the other, against a spring plate forming the movable abutment.

28. A brake according to claim 27, wherein said elastic linkage means includes a substantially coaxial member coaxial to the compression spring and displaceably guided through an aperture in said housing means, said coaxial member being pivotally connected at a part of the spring plate means on the side of the compression spring.

29. A brake according to claim 28, further comprising a pair of one-armed knee-lever means pivotally connected at said spring plate means on the side opposite the compression spring as input member of a guide linkage transmitting the force of the compresion spring, one lever arm of said pair of knee-lever means deflectingly engaging at a part of said housing means disposed substantially perpendicular to the spring axis.

30. A brake according to claim 29, further comprising lever shear means extending freely movably through said brake carrier means into said housing means, said pair of knee-lever means engaging with lever arms of said lever shear means.

31. A brake according to claim 30, wherein one lever arm of the lever shear means is pivotally connected as reaction member at the primary brake shoe means and the output member of the force reduction means is supported against the other lever arm of the lever shear means forming the output member of the guide linkage means and engaging in guide means provided at the primary brake shoe means.

32. A servo drum brake, especially for commercial-type vehicles, comprising brake carrier means, primary brake shoe means, secondary brake shoe means, brake drum means, said primary and secondary brake shoe means being floatingly supported within said brake drum means, and means operatively connecting said primary brake shoe means with said secondary brake shoe means to provide a power path therebetween including force reduction means to reduce the servo force from said primary brake shoe means to said secondary brake shoe means at a predetermined braking moment, wherein said connecting means includes bridging means provided with elastic intermediate means operable between said primary and secondary brake shoe means for bypassing said force reduction means.

33. A brake according to claim 32, further comprising an abutment on said primary brake shoe means, said elastic intermediate means being under prestress by said abutment.

34. A brake according to claim 33, further comprising compensating means for compensating the wear of the brake linings including an adjusting member, a primary pressure piece and a secondary pressure piece between said brake shoe means, and force reduction means being operatively interposed in the power path between a brake shoe means and a respective pressure piece of the compensating means.

35. A brake according to claim 34, wherein said adjusting member is in motion-responsive connection with the secondary part, and means for displacing said first threaded part in the direction of the reaction member of the force reduction means by the readjusting movements of said compensating means.

36. A brake according to claim 32, further comprising means for adjusting the prestress of the elastic intermediate means in dependence on the load of the vehicle.

References Cited
UNITED STATES PATENTS

| | | | |
|---|---|---|---|
| 2,196,333 | 4/1940 | Bowen | 188—78 |
| 2,246,242 | 6/1941 | Chase | 188—78 |
| 2,266,727 | 12/1941 | Ambrose | 188—78 |

DUANE A. REGER, *Primary Examiner.*

U.S. Cl. X.R.

188—78